US008051212B2

(12) United States Patent
Kagan et al.

(10) Patent No.: US 8,051,212 B2
(45) Date of Patent: *Nov. 1, 2011

(54) NETWORK INTERFACE ADAPTER WITH SHARED DATA SEND RESOURCES

(75) Inventors: Michael Kagan, Zichron Yaakov (IL); Diego Crupnicoff, Haifa (IL); Margarita Shnitman, Netivot (IL); Ariel Shachar, Haifa (IL); Ram Izhaki, Kibbutz Ha'Solelim (IL); Gilad Shainer, Karkur (IL); Aviram Gutman, Haifa (IL); Benny Koren, Zichron Yaakov (IL); Dafna Levenvirth, Jerusalem (IL); Gil Bloch, Kiryat Ata (IL); Yael Shenhav, Haifa (IL)

(73) Assignee: Mellanox Technologies Ltd., Yokneam (IL)

(*) Notice: Subject to any disclaimer, the term of this patent is extended or adjusted under 35 U.S.C. 154(b) by 759 days.

This patent is subject to a terminal disclaimer.

(21) Appl. No.: 10/000,456

(22) Filed: Dec. 4, 2001

(65) Prior Publication Data

US 2002/0152327 A1    Oct. 17, 2002

Related U.S. Application Data (60) Provisional application No. 60/283,018, filed on Apr. 11, 2001.

(51) Int. Cl.
*G06F 15/16* (2006.01)
(52) U.S. Cl. .................. 709/250; 709/249
(58) Field of Classification Search .......... 709/212–217, 709/250, 249
See application file for complete search history.

(56) References Cited

U.S. PATENT DOCUMENTS

| 5,838,904 | A  | * | 11/1998 | Rostoker et al. | 709/250 |
|---|---|---|---|---|---|
| 5,922,046 | A  | * | 7/1999 | Thomas et al. | 709/212 |
| 6,578,122 | B2 | * | 6/2003 | Beukema et al. | 711/163 |
| 6,594,712 | B1 | * | 7/2003 | Pettey et al. | 710/22 |
| 6,611,883 | B1 | * | 8/2003 | Avery | 710/22 |
| 6,718,370 | B1 | * | 4/2004 | Coffman et al. | 709/212 |
| 6,742,075 | B1 | * | 5/2004 | Bailey et al. | 710/310 |
| 6,948,004 | B2 | * | 9/2005 | Gasbarro et al. | 709/250 |
| 7,003,586 | B1 | * | 2/2006 | Bailey et al. | 709/250 |
| 7,107,359 | B1 | * | 9/2006 | Burton et al. | 709/250 |
| 7,149,817 | B2 | * | 12/2006 | Pettey | 709/250 |
| 7,149,819 | B2 | * | 12/2006 | Pettey | 709/250 |
| 2002/0144001 | A1 | * | 10/2002 | Collins et al. | 709/250 |
| 2003/0014544 | A1 | * | 1/2003 | Pettey | 709/249 |
| 2003/0050990 | A1 | * | 3/2003 | Craddock et al. | 709/212 |
| 2006/0129699 | A1 | * | 6/2006 | Kagan et al. | 709/250 |

OTHER PUBLICATIONS

Scatter/Gather and Bidirectional data transfers, by Edward A. Gardner, Nov. 16, 2000, doc.: T10/00-410r0, obtained from the Internet at: http://www.t10.org/ftp/t10/document.00/00-410r0.pdf.*

(Continued)

*Primary Examiner* — Kamal Divecha
(74) *Attorney, Agent, or Firm* — Mark M. Friedman (57) ABSTRACT

A network interface adapter includes an outgoing packet generator, adapted to generate an outgoing request packet for delivery to a remote responder responsive to a request submitted by a host processor and a network output port, coupled to transmit the outgoing request packet over a network to the remote responder. A network input port receives an incoming response packet from the remote responder, in response to the outgoing request packet sent thereto, as well as an incoming request packet sent by a remote requester. An incoming packet processor receives and processes both the incoming response packet and the incoming request packet, and causes the outgoing packet generator, responsive to the incoming request packet, to generate, in addition to the outgoing request packet, an outgoing response packet for transmission to the remote requester.

28 Claims, 6 Drawing Sheets

OTHER PUBLICATIONS

The InfiniBand Architecture Specification, Release 1.0, Oct. 2000. (Available at: www.infinibandta.org.), (4 pages).

The IBM PCI-X to InifiniBand Host Channel Adapter, Produced by IBM Microelectronics Division, Hopewell Junction, New York, Oct. 2000, (3 pages).

* cited by examiner

NETWORK INTERFACE ADAPTER WITH SHARED DATA SEND RESOURCES

CROSS-REFERENCE TO RELATED APPLICATION

This application claims the benefit of U.S. Provisional Patent Application No. 60/283,018, filed Apr. 11, 2001, which is incorporated herein by reference.

FIELD OF THE INVENTION

The present invention relates generally to digital network communications, and specifically to remote direct memory access (RDMA) to data over a digital network.

BACKGROUND OF THE INVENTION

The computer industry is moving toward fast, packetized, serial input/output (I/O) bus architectures, in which computing hosts and peripherals are linked by a switching network, commonly referred to as a switching fabric. A number of architectures of this type have been proposed, culminating in the "InfiniBand™" (IB) architecture, which has been advanced by a consortium led by a group of industry leaders (including Intel, Sun Microsystems, Hewlett Packard, IBM, Compaq, Dell and Microsoft). The IB architecture is described in detail in the InfiniBand Architecture Specification, Release 1.0 (October, 2000), which is incorporated herein by reference. This document is available from the InfiniBand Trade Association at www.infinibandta.org.

A host processor (or host) connects to the IB network via a network interface adapter, which is referred to in IB parlance as a host channel adapter (HCA). Typically, the HCA is implemented as a single chip, with connections to the host bus and to the network. Client processes running on the host communicate with the transport layer of the IB fabric by manipulating a transport service instance, known as a "queue pair" (QP), made up of a send work queue and a receive work queue. The IB specification permits the HCA to allocate as many as 16 million ($2^{24}$) QPs, each with a distinct queue pair number (QPN). A given client may open and use multiple QPs simultaneously. To send and receive communications over the network, the client initiates work requests (WRs), which causes work items, called work queue elements (WQEs), to be placed onto the appropriate queues. The channel adapter then executes the work items, so as to communicate with the corresponding QP of the channel adapter at the other end of the link.

The QP that initiates a particular operation, i.e. injects a message into the fabric, is referred to as the requester, while the QP that receives the message is referred to as the responder. An IB operation is defined to include a request message generated by the requester and, as appropriate, its corresponding response generated by the responder. (Not all request messages have responses.) Each message consists of one or more IB packets. Typically, a given HCA will serve simultaneously both as a requester, transmitting requests and receiving responses on behalf of local clients, and as a responder, receiving requests from other channel adapters and returning responses accordingly. Request messages include, inter alia, remote direct memory access (RDMA) write and send requests and atomic read-modify-write operations, all of which cause the responder to write data to a memory address at its own end of the link, and RDMA read requests, which cause the responder to read data from a memory address and return it to the requester. Most response messages consist of a single acknowledgment packet, except for RDMA read responses, which may contain up to $2^{31}$ bytes of data, depending on the data range specified in the request.

The maximum number of RDMA read requests for a particular QP that can be outstanding at any one time is negotiated between the HCAs involved when the connection between them is established. (The maximum also covers atomic operations supported by some HCAs.) The responder may restrict the number of outstanding RDMA read requests per QP, and may even allow no RDMA read requests at all for some QPs. The need for this restriction stems from the fact that each outstanding RDMA read request consumes a certain amount of memory on the HCA chip. Because of the high cost of this HCA memory, IB devices known in the art typically allow no more than one or a few outstanding read requests per QP. Therefore, the requester must wait until its outstanding RDMA read operations have been completed before sending further RDMA read requests.

To handle the dual role of requester and responder, IB HCAs known in the art typically have separate, independent transmit and receive hardware structures. An example of such a HCA is the IBM PCI-X to InfiniBand Host Channel Adapter, produced by IBM Microelectronics Division (Hopewell Junction, N.Y.). This device features a dual pipeline architecture, with independent microprocessors and DMA engines for concurrent receive and transmit data path processing. It implements a layered memory structure, in which connection-related information is stored in on-device memory and also, optionally, in off-device memory attached to the HCA (not in system memory associated with the host). This optional configuration allows support of up to 16K QPs, with up to four outstanding RDMA read requests per QP.

SUMMARY OF THE INVENTION

It is an object of the present invention to provide improved devices and methods for interfacing a host processor to a network, and particularly to provide improved HCAs.

It is a further object of some aspects of the present invention to provide a HCA that performs RDMA read and write operations efficiently, with reduced hardware requirements relative to devices known in the art.

It is still a further object of some aspects of the present invention to provide a HCA capable of handling a substantially unrestricted number of outstanding RDMA read requests.

In preferred embodiments of the present invention, a HCA is configured to handle both requester and responder communication flows using common hardware resources, rather than maintaining separate hardware paths for these functions as in devices known in the art. This novel HCA architecture is based on the realization that despite the differences in syntax and usage of the different types of request and response messages that the HCA must convey, there are some basic similarities in the ways that the HCA generates the requests and services the responses. In particular, both when the HCA as a responder gets RDMA write and send requests from a remote requester, and when the HCA as a requester gets RDMA read responses that it has requested from a remote responder, the HCA receives data packets from a remote source and "scatters" it to local memory. In preferred embodiments of the present invention, both of these receiving functions are handled by a common scatter engine, wherein the addresses to which the data are to be scattered are specified by the requester—local or remote—in each case. Atomic operations are preferably handled in like manner.

By the same token, in generating RDMA write and send requests to a remote responder, as in preparing RDMA read responses to send to a remote requester, the HCA "gathers" data from the local memory and sends it in packets to a remote destination. Client processes on the local host generate write and send requests by submitting WRs to the HCA, so that WQEs are placed in the appropriate HCA queues. A gather engine services the WQEs by reading the specified data from the local memory and inserting the data in request packets for transmission. To conform to this model, when the HCA receives RDMA read requests from a remote requester, it similarly generates a list of quasi-WQEs in local memory, which identify the data to be sent to the requester. These quasi-WQEs differ semantically from the WQEs generated by the local host, but they are handled by the HCA in the same way. The quasi-WQEs are serviced by the same gather engine that is responsible for servicing the write and send requests.

The novel architecture of the present invention reduces markedly the amount of hardware required to implement the HCA, since the scatter and gather engines are shared by the requester and responder functions, rather than having a separate scatter and gather engine for each function as in devices known in the art. The overall design of the HCA is thus simplified, since only a single data flow path must be implemented. Furthermore, because the HCA uses the same resources to handle both the requester and responder flows, it inherently allocates the resources dynamically in response to load variations between local and remote requests, so that the efficiency of the HCA is enhanced.

A further advantage realized in some preferred embodiments of the present invention is that there is substantially no restriction placed on the number of outstanding RDMA read requests from remote requesters that the HCA can handle. This advantage stems from the use of the local memory to hold quasi-WQEs indicating the RDMA read responses to be sent by the HCA. Each quasi-WQE corresponds to an outstanding RDMA read request. Consequently, the number of outstanding RDMA read requests is limited not by the small, costly memory of the HCA chip, but only by the considerably larger size of the available memory allocated for this purpose off the HCA chip (either host memory or dedicated off-chip memory).

Although preferred embodiments are described herein with reference to IB switch fabrics and specifically to HCAs for use with such fabrics, the principles of the present invention may similarly be applied, mutatis mutandis, to channel adapters of other types, such as target channel adapters (TCAs), as well as to network interface adapters used in packet networks of other types.

There is therefore provided, in accordance with a preferred embodiment of the present invention, a network interface adapter, including:

a host interface, for coupling to a host processor;

an outgoing packet generator, adapted to generate an outgoing request packet for delivery to a remote responder responsive to a request submitted by the host processor via the host interface;

a network output port, coupled to receive the request packet from the output packet generator, so as to transmit the outgoing request packet over a network to the remote responder;

a network input port, for coupling to the network so as to receive an incoming response packet from the remote responder, in response to the outgoing request packet sent thereto, and further to receive an incoming request packet sent by a remote requester;

an incoming packet processor, coupled to the network input port so as to receive and process both the incoming response packet and the incoming request packet, and further coupled to cause the outgoing packet generator, responsive to the incoming request packet, to generate, in addition to the outgoing request packet, an outgoing response packet for transmission via the network output port to the remote requester.

In a preferred embodiment, the outgoing request packet includes an outgoing write request packet containing write data taken from a system memory accessible via the host interface, and the outgoing response packet includes an outgoing read response packet containing read data taken from the system memory in response to the incoming request packet, and the outgoing packet generator includes a gather engine, which is coupled to gather both the write data and the read data from the system memory for inclusion in the respective outgoing packets.

Preferably, to submit the request, the host processor writes a request descriptor indicative of the write data to a first memory location, and to cause the outgoing packet generator to generate the outgoing response packet, the incoming packet processor writes a response descriptor indicative of the read data to a second memory location, and the gather engine is adapted to read information from the descriptors and to gather the read data and the write data responsive thereto.

In a further preferred embodiment, the outgoing packet generator includes a plurality of schedule queues, and is adapted to generate the outgoing request packet and the outgoing response packet responsive to respective entries placed in the queues. Preferably, the network input and output ports are adapted to receive and send the incoming and outgoing packets, respectively, over a plurality of transport service instances, and the outgoing request packet and the outgoing response packet are associated with respective instances among the plurality of transport service instances, and the outgoing packet generator is adapted to assign the transport service instances to the queues based on service parameters of the instances, and to place the entries in the schedule queues corresponding to the transport service instances with which the incoming and outgoing packets are associated.

Further preferably, the outgoing packet generator includes one or more execution engines, which are adapted to generate the outgoing request packet and the outgoing response packet responsive to a list of work items respectively associated with each of the transport service instances, and a scheduler, which is coupled to select the entries from the queues and to assign the instances to the execution engines for execution of the work items responsive to the service parameters.

Additionally or alternatively, the outgoing packet generator includes one or more doorbell registers, to which the host processor and the incoming packet processor write in order to place the entries in the queues. Further additionally or alternatively, the incoming request packet includes a write request packet carried over the network on a reliable transport service, and responsive to the incoming write request packet, the incoming packet processor is adapted to add an entry to the entries placed in the queues, such that responsive to the entry, the outgoing packet generator generates an acknowledgment packet.

In yet a further preferred embodiment, the incoming request packet includes an incoming read request packet, and responsive to the incoming read request packet, the incoming packet processor is adapted to prepare a read response work item in a memory location, and the outgoing packet generator is coupled to read the read response work item from the memory location and, responsive thereto, to generate a read response packet.

Preferably, the incoming packet processor is configured so that when it receives an incoming write request packet containing write data to be written to a system memory accessible via the host interface after receiving the incoming read request packet, it conveys the write data to the host interface without waiting for execution of the read response work item. Additionally or alternatively, the incoming packet processor is configured so that when it receives an incoming write request packet containing write data to be written to a system memory accessible via the host interface before receiving the incoming read request packet, it prevents execution of the read response work item until the write data have been written to the system memory.

In still a further preferred embodiment, the incoming response packet includes an incoming read response packet sent by the remote responder in response to the outgoing request packet, the incoming read response packet containing read data to be written to a system memory accessible via the host interface, and the incoming request packet includes an incoming write request packet containing write data to be written to the system memory, and the incoming packet processor includes a scatter engine, which is coupled to scatter both the write data and the read data from the respective incoming patents to the system memory.

Preferably, the outgoing packet generator is adapted, upon generating the outgoing request packet, to notify the incoming packet processor to await the incoming response packet so as to write a completion message to the host interface when the awaited packet is received.

In another preferred embodiment, the incoming request packet includes an incoming read request packet specifying data to be read from a system memory accessible via the host interface, and the incoming packet processor is adapted to write a response descriptor to a memory location indicating the data to be read from the system memory responsive to the read request packet, and the outgoing packet processor is adapted to read the response descriptor from the memory location and, responsive thereto, to read the indicated data and to generate the outgoing response packet containing the indicated data.

Typically, the incoming read request packet is one of a plurality of incoming read request packets, and the incoming packet processor is preferably adapted to write the response descriptor to the memory location as part of a list of such descriptors, responsive to which the outgoing packet processor is adapted to generate the outgoing response packet as part of a sequence of such packets. Further preferably, the network input and output ports are adapted to receive and send the incoming and outgoing packets, respectively, over a plurality of transport service instances, and the incoming packet processor is adapted to prepare the list of the response descriptors for each of the instances as a part of a response database held for the plurality of the instances in common.

When the request includes a write request, which is submitted by the host processor by generating a request descriptor indicating further data to be read from the system memory for inclusion in the outgoing request packet, and the output packet generator is preferably adapted to read the request descriptor and, responsive thereto, to generate the outgoing request packet as a write request packet containing the indicated further data.

There is also provided, in accordance with a preferred embodiment of the present invention, a network interface adapter, which includes a plurality of circuit elements arranged on a single integrated circuit chip, the elements including:

a host interface, for coupling to a host processor and to host system resources associated with the host processor;

a network input port, for coupling to a network so as to receive incoming read request packets sent by a remote requester, specifying data to be read via the host interface;

an incoming packet processor, coupled to the network input port so as to receive and process the incoming read request packets, and further coupled to a memory off the chip so as to write a list of descriptors to the memory indicating the data to be read in response to the incoming read request packets;

an outgoing packet processor, coupled to the host interface so as to read the list of descriptors from the memory and, responsive thereto, to read the indicated data and to generate outgoing response packets containing the indicated data; and a network output port, coupled to receive the outgoing response packets from the outgoing packet processor so as to transmit the outgoing response packets over the network to the remote requester.

Preferably, the outgoing packet processor includes a doorbell register, and the incoming packet processor is coupled to write to the doorbell register in order to signal the outgoing packet processor to read the list.

In a preferred embodiment, the network input and output ports are adapted to receive and send the incoming and outgoing packets, respectively, over a plurality of transport service instances, and the incoming packet processor is adapted to write the descriptors to a plurality of lists corresponding to the plurality of the transport service instances. Preferably, the incoming packet processor is adapted to maintain the plurality of the lists in a response database held in the memory for all the instances in common. Most preferably, each of the instances is assigned a respective number of entries in the database to which its descriptors can be written, and the entries for each of the instances are arranged in the database in a cyclic buffer.

In a preferred embodiment, the transport service instances include queue pairs.

Preferably, the outgoing packet generator includes a plurality of schedule queues and is adapted to generate the outgoing response packets responsive to entries placed in the queues, each of the entries corresponding to one of the transport service instances for which the lists were prepared by the incoming packet processor. Most preferably, the transport service instances are assigned to the queues based on service parameters of the instances, and the outgoing packet generator includes a scheduler, which is coupled to select the entries from the queues for service responsive to the service parameters.

Preferably, each of the descriptors occupies a given volume of space in the off-chip memory, and a maximum number of incoming read requests, generated responsive to the incoming read request packets, that can be outstanding at any given time is determined by the space available in the off-chip memory.

Additionally or alternatively, the system resources associated with the host processor include a system memory, and at least a portion of the off-chip memory to which the list of descriptors is written is included in the system memory.

There is additionally provided, in accordance with a preferred embodiment of the present invention, a method for coupling a host processor to a network, including:

generating an outgoing request packet for delivery to a remote responder using an outgoing packet generator, responsive to a request submitted by the host processor;

transmitting the outgoing request packet from the output packet generator over the network to the remote responder;

receiving an incoming response packet from the remote responder, in response to the outgoing request packet sent thereto, using an incoming packet processor;

receiving an incoming request packet sent by a remote requester using the incoming packet processor; and coupling the incoming packet processor to the outgoing packet generator so as to cause the outgoing packet generator to generate, responsive to the incoming request packet, in addition to the outgoing request packet, an outgoing response packet for transmission via the network to the remote requester.

There is further provided, in accordance with a preferred embodiment of the present invention, a method for coupling a host processor and a system memory associated therewith to a network, including:

receiving at a network interface adapter chip coupled to the host processor incoming read request packets sent by remote requesters over respective transport service instances on the network, the read request packets specifying data to be read from the system memory;

writing descriptors using the network adapter chip, responsive to the incoming read request packets, in a plurality of lists in an off-chip memory, the lists corresponding respectively to the transport service instances, the descriptors indicating the data to be read from the system memory;

reading the lists of descriptors from the off-chip memory and, responsive thereto, reading the indicated data and generating outgoing response packets containing the indicated data; and transmitting the outgoing response packets to the remote requesters over respective transport service instances on the network.

The present invention will be more fully understood from the following detailed description of the preferred embodiments thereof, taken together with the drawings in which:

DETAILED DESCRIPTION OF PREFERRED EMBODIMENTS

Figure 1:
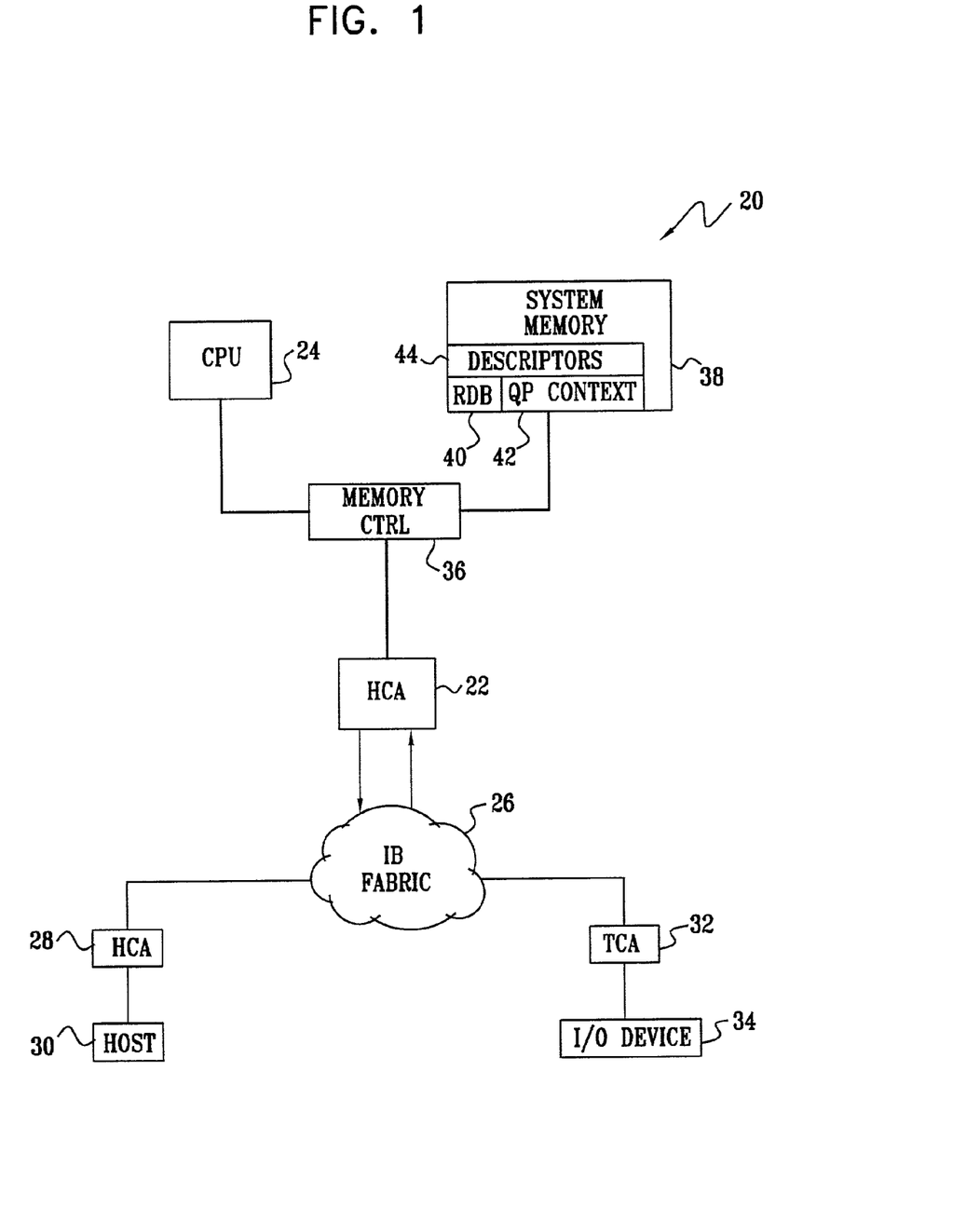
FIG. 1 is a block diagram that schematically illustrates a computer network, in accordance with a preferred embodiment of the present invention.

FIG. 1 is a block diagram that schematically illustrates an IB network communication system 20, in accordance with a preferred embodiment of the present invention. In system 20, a HCA 22 couples a host processor 24 to an IB network (or fabric) 26. Typically, processor 24 comprises an Intel Pentium™ processor or other general-purpose computing device with suitable software. HCA 22 typically communicates via network 26 with other HCAs, such as a remote HCA 28 with a remote host 30, as well as with TCAs, such as a TCA 32 connected to an input/output (I/O) device 34.

Host 24 and HCA 22 are connected to a system memory 38 via a suitable memory controller 36, as is known in the art. The HCA and memory typically occupy certain ranges of physical addresses in a defined address space on a bus connected to the controller, such as a Peripheral Component Interface (PCI) bus. In addition to the host operating system, applications and other data (not shown), memory 38 holds data structures that are accessed and used by HCA 22. These data structures preferably include a response database (RDB) 40 and QP context information 42 maintained by the HCA, and descriptors 44 indicating DMA operations to be carried out by HCA 22. RDB 40 is used to keep track of outstanding RDMA read requests by remote requesters, as described in greater detail hereinbelow. Certain aspects of the structure and use of QP context information 42 are described in greater detail in a U.S. patent application entitled "Multiple Queue Pair Access with a Single Doorbell," filed Nov. 26, 2001 and published Nov. 7, 2002 as U.S. Patent Application Publication No. 2002/0165899. Descriptors 44 are preferably prepared and executed in the form of a linked list, as described in another U.S. patent application entitled "DMA Doorbell," filed May 31, 2001, published Dec. 6, 2001 as U.S. Patent Application Publication No. 2001/0049755 and issued May 11, 2004 as U.S. Pat. No. 6,735,642. Both of these applications are assigned to the assignee of the present patent application, and their disclosures are incorporated herein by reference.

Figure 2:
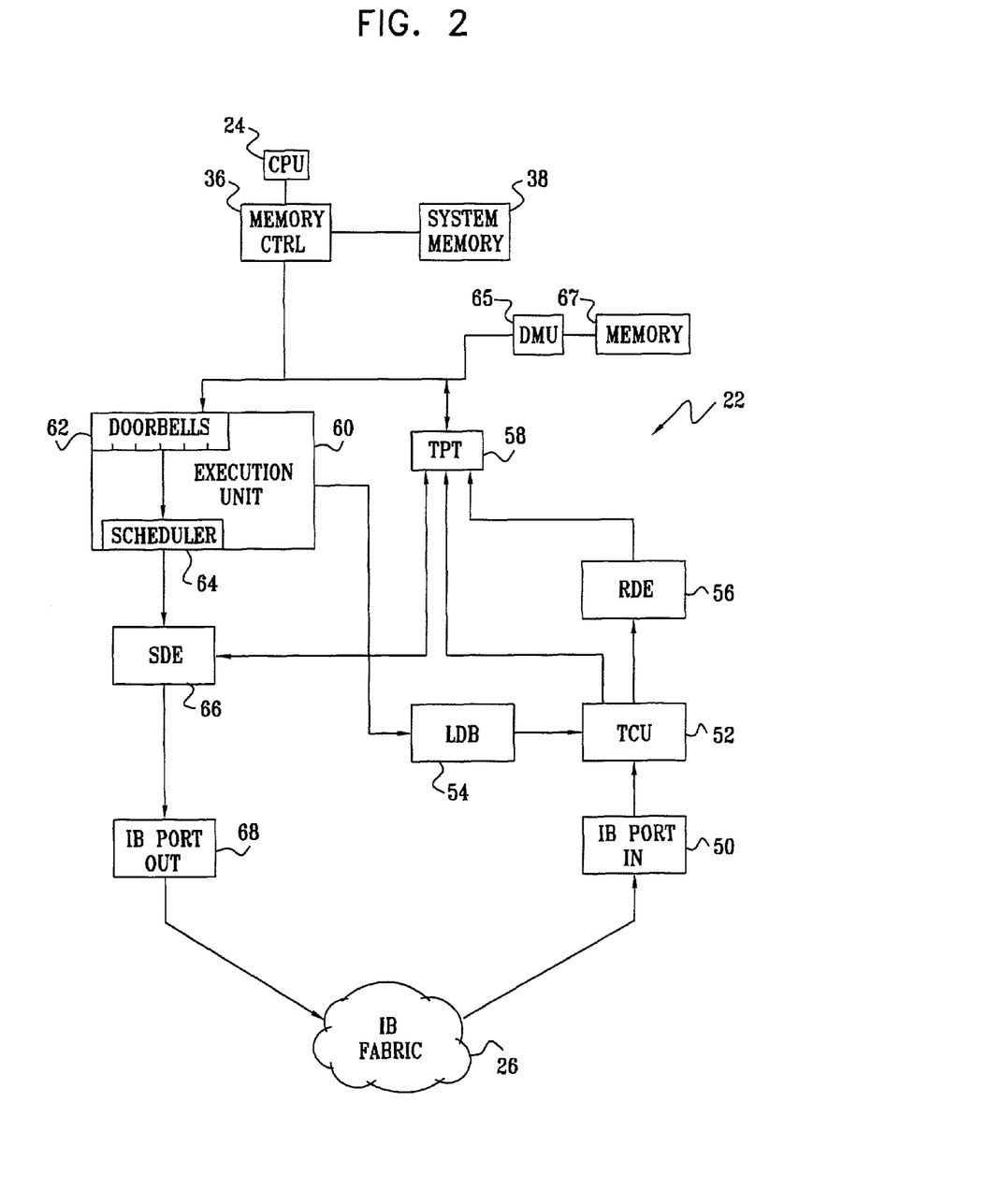
FIG. 2 is a block diagram that schematically shows details of a HCA, in accordance with a preferred embodiment of the present invention.

FIG. 2 is a block diagram that schematically shows details of HCA 22, in accordance with a preferred embodiment of the present invention. For the sake of simplicity, not all of the interconnections between the blocks are shown in the figure, and some blocks that would typically be included in HCA 22 but are inessential to an understanding of the present invention are omitted. The blocks and links that must be added will be apparent to those skilled in the art. The various blocks that make up HCA 22 may be implemented either as hardware circuits or as software processes running on a programmable processor, or as a combination of hardware- and software-implemented elements. Although certain functional elements of HCA 22 are shown as separate blocks in the figure for the sake of conceptual clarity, the functions represented by these blocks may actually be carried out by different software processes on a single processor. Preferably, all of the elements of the HCA are implemented in a single integrated circuit chip, but multi-chip implementations are also within the scope of the present invention.

Packets sent to HCA 22 over network 26 are received at an input port 50, which performs data link and buffering functions, as are known in the art. A transport check unit (TCU) 52 processes and verifies transport-layer information contained in the incoming packets, as described in greater detail hereinbelow. The TCU passes data that are to be written to memory 38 to a receive data engine (RDE) 56. The RDE serves as a scatter engine both for RDMA write and send requests received by HCA 22 from remote requesters (such as HCA 28, in FIG. 1) and for RDMA read responses returned to HCA 22 by remote responders (HCA 28 or TCA 32, for example). A translation protection table (TPT) 58 acts as a host interface in HCA 22. It is used for address translation and protection checks to control access to memory 38 both by elements of HCA 22 and by other, remote entities connected to network 26.

In order to send out packets from HCA 22 on a given QP over network 26, host 24 posts WQEs for the QP by writing descriptors 44 in memory 38 (FIG. 1). For RDMA write and send requests, the descriptors indicate the source of data to be sent and its destination. The data source information typically includes a "gather list," pointing to the locations in memory 38 from which the data in the outgoing message are to be taken. After host 24 has prepared one or more descriptors, it "rings" a doorbell 62 of HCA 22, by writing to a corresponding doorbell address occupied by the HCA in the address space on the host bus. The doorbell thus serves as an additional interface between host 24 and HCA 22. The process of ringing and servicing doorbell 62 is described in detail in the above-mentioned patent applications.

Similarly, when TCU 52 receives a RDMA read request from a remote requester on a certain QP, it prepares a "quasi-WQE" indicating the required RDMA read response and places the quasi-WQE in a list belonging to the QP in RDB 40. Preferably, for the sake of efficiency, some or all of the RDB is held in an off-chip memory 67 coupled to the HCA, which is accessed using a double-data-rate memory controller (DMU) 65, rather than via the system bus. Additionally or alternatively, the RDB may be held in system memory 38, as shown in FIG. 1. RDE 56 rings another doorbell 62 to indicate that a RDMA read response or other response packet (such as an acknowledge message or atomic operation data) is ready to be sent.

An execution unit 60 queues the QPs having WQEs or quasi-WQEs that are awaiting service. A scheduler 64 selects the QPs to be serviced by arbitrating among the queues. The scheduling process is described in greater detail hereinbelow. A send data engine (SDE) 66 gathers the data to be sent from the locations in memory 38 specified by the WQEs, via TPT 58, and places the data in output packets for transmission over network 26. The data packets prepared by SDE 66 are passed to an output port 68, which performs data link operations and other necessary functions and sends the packets out over network 26.

When the last packet required by a given WQE has been sent, execution unit 60 writes an entry in a local database (LDB) 54. The LDB is shared dynamically by all of the QPs served by the execution unit and the SDE, and holds the entries for each QP in the form of a linked list. TCU 52 reads the entries from the LDB for each QP in sequence in order to write corresponding completion queue elements (CQEs) to completion queues in memory 38, as mandated by the IB standard. For unreliable connections, the CQE can be written immediately, while for reliable connections, the CQE is written only after an acknowledgment is received from the network.

Figure 3:
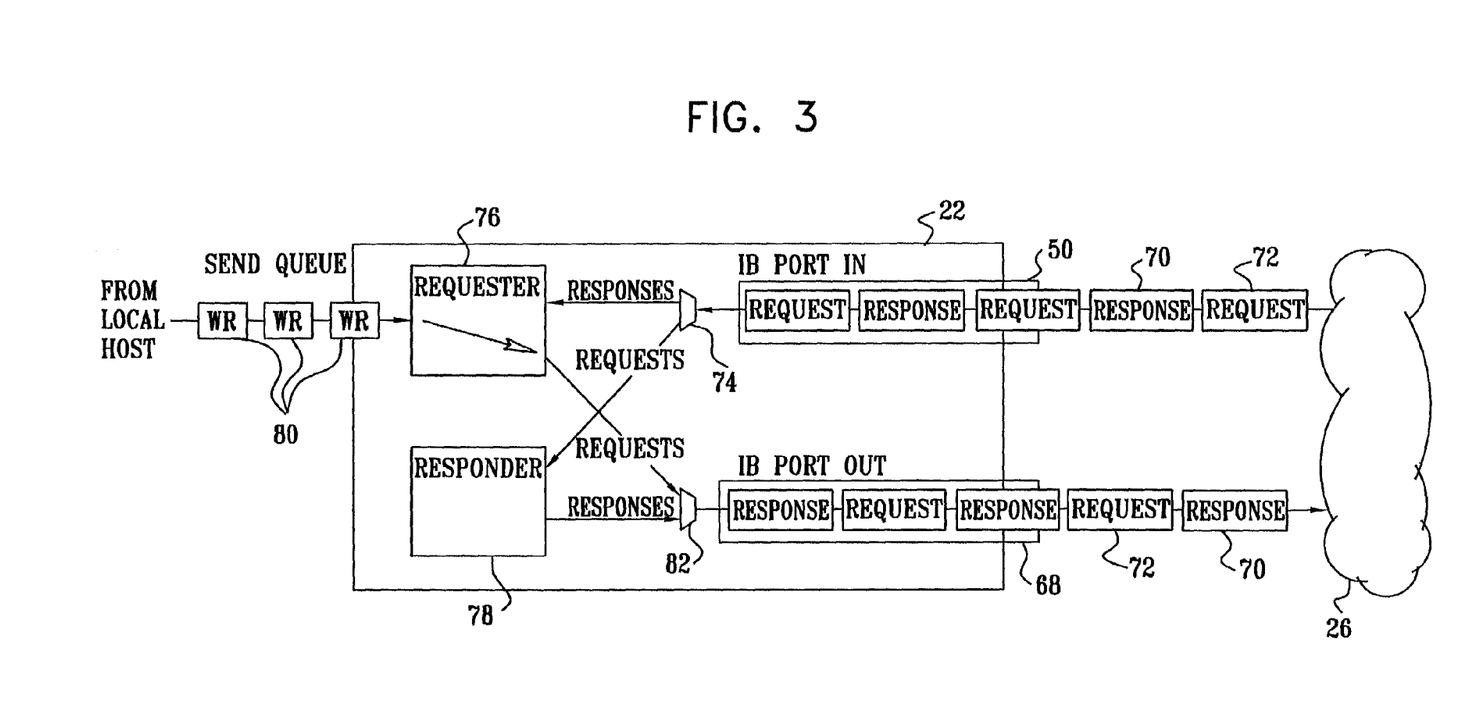
FIG. 3 is a block diagram that schematically illustrates data flow in the HCA of FIG. 2, in accordance with a preferred embodiment of the present invention.

FIG. 3 is a block diagram that schematically illustrates data flow in HCA 22, in accordance with a preferred embodiment of the present invention. Whereas FIG. 2 illustrates mainly the physical structure of HCA 22, FIG. 3 shows the conceptual and functional structure. As is known in the IB art, HCA 22 typically sends and receives both response packets 70 and request packets 72. The request packets are sent by a requester function 76, in response to WRs 80 submitted by a local host, such as host 24 or host 30 (FIG. 1). Such packets include RDMA write and send requests, RDMA read requests, and requests of other types provided by the IB specification. When HCA 22 receives such a request, a responder function 78 prepares and sends the required response packets. Response packets include RDMA read response packets containing data specified by RDMA read requests, and acknowledgment packets in reply to requests of other types when required (such as write acknowledge packets when a reliable transport service is used).

Packets received over network 26 by input port 50 are demultiplexed by a demultiplexing function 74, so that response packets 70 are sent to requester 76, while request packets 72 are sent to responder 78. The demultiplexing function is carried out essentially by TCU 52. Read responses containing RDMA data returned by remote responders are passed to memory 38, to be read by the process that requested them, while read requests from remote requesters generate quasi-WQEs to be handled by responder 78. A multiplexing function 82 combines request packets 72 generated by requester 76 with response packets 70 prepared by responder 78 for transmission via output port 68. This function is carried out essentially by execution unit 60.

Figure 4:
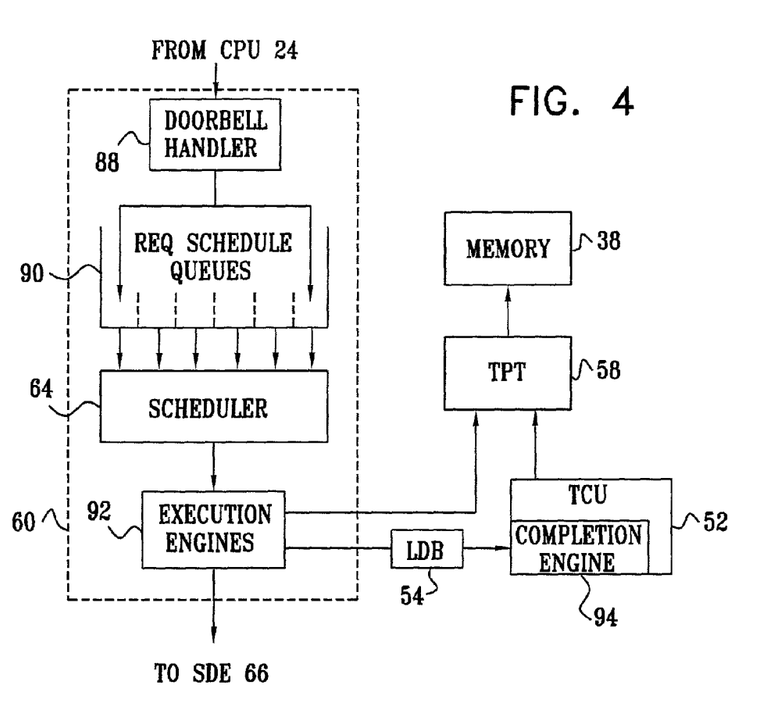
FIG. 4 is a block diagram that schematically illustrates request operation flow in the HCA of FIG. 2, in accordance with a preferred embodiment of the present invention.

FIG. 4 is a block diagram that schematically illustrates details of request operations carried out by HCA 22, in accordance with a preferred embodiment of the present invention. When a process on host 24 submits a WR by ringing its assigned doorbell 62, a doorbell handler 88 enters the corresponding QP in one of a plurality of requester schedule queues 90 that it maintains. Each QP is preferably assigned in advance to a certain schedule queue, and the assignment is recorded in QP context 42 (FIG. 1). Each of queues 90 can have a different Quality of Service (QoS) level, and the assignment of the QPs to one of the schedule queues most preferably depends on the QoS assigned to the QP.

Scheduler 64 arbitrates among schedule queues 90 in accordance with the QoS levels. The arbitration process is described in detail hereinbelow with reference to FIG. 7. Preferably, for each queue 90, scheduler 64 holds only the QP number of the first QP in the queue. The remaining QPs are held in a "virtual queue," created by setting a next-QP pointer in the QP context of each QP in the schedule queue to point to the next QP in the queue. Thus, a new QP is added to an existing schedule queue by setting the next-QP pointer in the last QP in the queue to point to the new QP, and the schedule queue uses only a minimal amount of memory no matter how long it is.

Each QP that the scheduler selects for service is passed to one of an array of execution engines 92, which fetches the WQEs of that QP from memory 38. The execution engine parses each WQE and prepares instructions to SDE 66 regarding a request packet or packets to be sent out. (Similarly, for each quasi-WQE, the execution engine prepares instructions to the SDE regarding the required response packet.) For write and send requests, the SDE gathers the data from memory 38 indicated by the instructions from the execution engine, loads the data into the packets, and passes the packets to output port 68 for transmission. Other types of request packets, such as reads and atomic requests, do not require the SDE to gather data from the memory.

After preparing the packets, execution unit 60 makes provision for informing the process that submitted the corresponding WR that the request has been carried out by writing an entry to LDB 54, as described above. In the case of unreliable transport services, a completion engine 94 in TCU 52 reports that the packet has been sent as soon as it reads the LDB entry, by writing via TPT 58 to the appropriate completion queue in memory 38. For reliable services, however, HCA 22 must wait to receive an acknowledgment or read response from the responder before reporting that the request has been completed. In this case, completion engine 94 checks incoming response packets to detect when the acknowledgment or read response arrives. When the completion engine determines that the desired response has been received, it writes via TPT 58 to the appropriate completion queue in memory 38. The requested operation is then complete. If the response packet does not arrive within a predetermined time frame, the execution engine is typically prompted to resend the request, in accordance with the IB specification.

Figure 5:
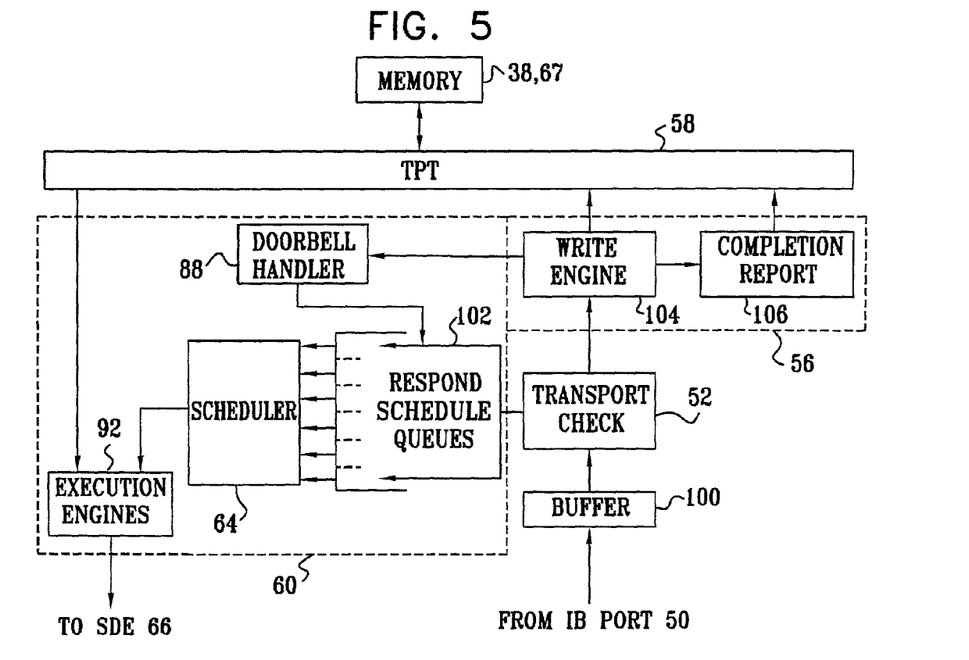
FIG. 5 is a block diagram that schematically illustrates response operation flow in the HCA of FIG. 2, in accordance with a preferred embodiment of the present invention.

FIG. 5 is a block diagram that schematically illustrates details of response operations carried out by HCA 22, in accordance with a preferred embodiment of the present invention. Incoming request packets received by input port 50 from remote channel adapters on network 26 are held in a buffer 100, if necessary, while waiting for HCA resources to become available to handle them. TCU 52 performs a transport check on the incoming packets and thus determines how they are to be handled.

When the incoming packet is a RDMA write or send request, TCU 52 passes the packet data to RDE 56, which attends to executing the requests in the order in which they are received by input port 50. A write engine 104 in RDE 56 writes the packet data, via TPT 58, to the specified addresses in memory 38. Optionally, a completion reporter 106 writes to a completion queue in memory 38 that the request has been carried out. When the request is received on a QP that is designated for reliable service, RDE 56 also rings an internal doorbell in the HCA, causing doorbell handler 88 to place an entry corresponding to the QP in a responder scheduling queue 102 to which this QP is assigned. The purpose of this entry is to cause execution unit 60 to send an acknowledgment to the remote requester. For posted write operations, the acknowledgment can be sent as soon as TCU 52 has completed the transport check and RDE 56 has validated memory access, whereas for delayed write operations, the acknowledgment is delayed until the write to system memory 38 has been successfully completed on the system bus. The selection of posted or non-posted write operation is based on an attribute specified for each memory region in TPT 58.

Receive scheduling queues 102, like send scheduling queues 90, are maintained by execution unit 60. Scheduler 64 arbitrates among the queues and selects the QPs to be passed to SDE 66 for preparation and transmission of response messages.

Figure 6:
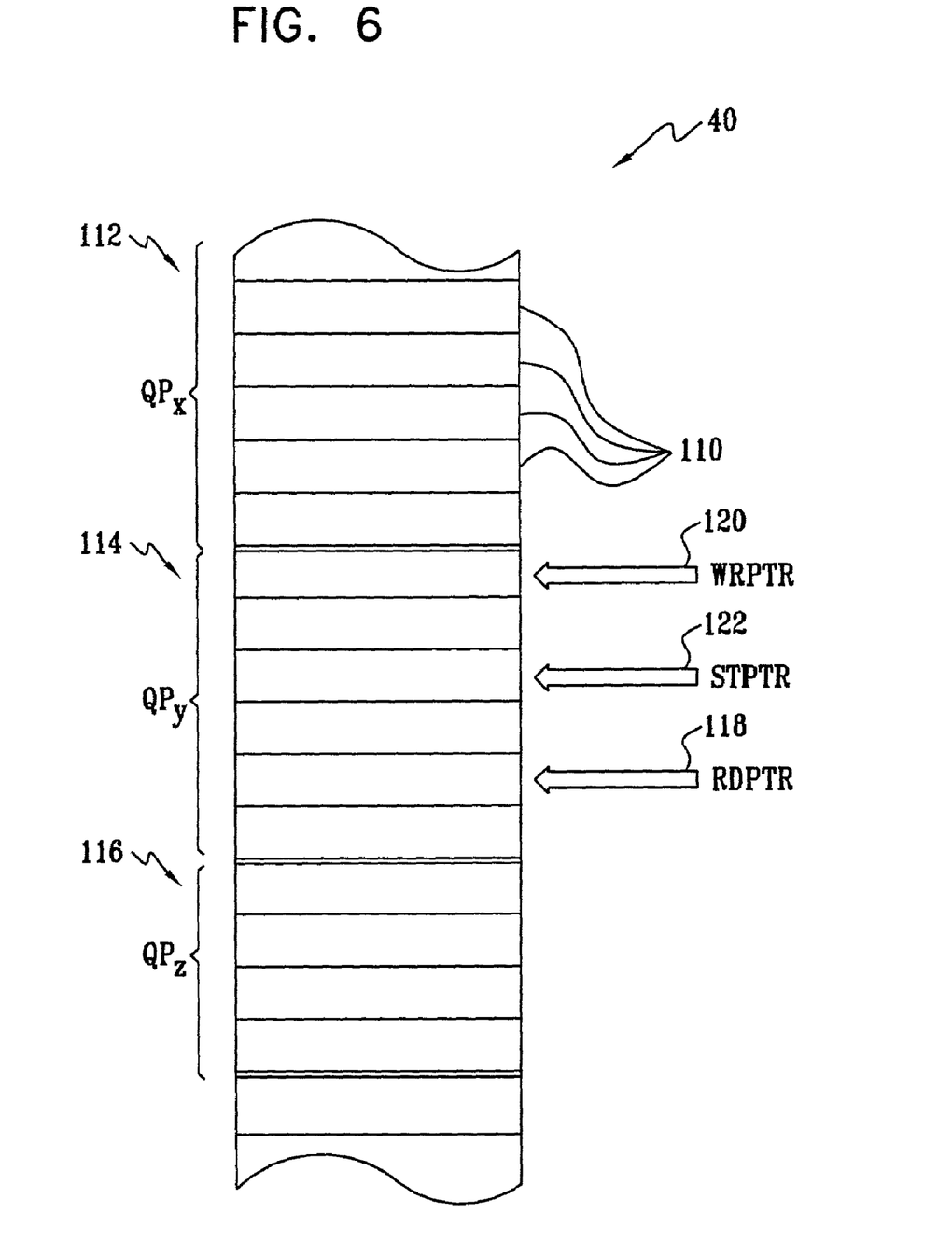
FIG. 6 is a block diagram that schematically illustrates a response database used in the response operation flow of FIG. 5, in accordance with a preferred embodiment of the present invention.

FIG. 6 is a block diagram that schematically illustrates the structure of RDB 40 in accordance with a preferred embodiment of the present invention. When the incoming packet is a RDMA read request, TCU 52 instructs write engine 104 to write an appropriate descriptor 110 to RDB 40, identifying the data to be read from memory 38 in order to respond to the request. These descriptors are referred to herein as "quasi-WQEs." Each request typically requires 32 bytes of memory, which include the operation code, packet serial number (PSN), data length, key and virtual address for the response (as well as the reply data for atomic operations).

Each QP has its own allocated section 112, 114, 116, etc., of RDB 40 for holding current quasi-WQE entries 110. The quasi-WQEs for each QP are preferably held in a cyclic buffer format in the allocated section of the RDB. The number of entries in the section corresponds to the maximum number of RDMA read requests that may be outstanding on the QP at any given time. Preferably, this number is fixed in advance for each QP, at the time the QP is established. Alternatively, the number of RDB entries allocated to each QP may be varied dynamically, using any suitable method of buffer sharing known in the art. Since outstanding RDMA read requests are stored in the form of quasi-WQE descriptors in off-chip memory 67 or 38, it is evident that each QP may at any time have as many read requests outstanding as desired, so long as sufficient buffer space has been allocated in the RDB to hold the requests.

After write engine 104 has written a quasi-WQE to RDB 40 for a given QP, RDE 56 rings the internal doorbell assigned to the QP, causing doorbell handler 88 to place a corresponding entry in the appropriate responder schedule queue 102. Scheduler 64 then passes the entry to one of execution engines 92 for preparation of the required response packets. The execution engine looks up and parses the next quasi-WQE 110 to be executed for the QP in RDB 40, and it instructs SDE 66 to retrieve the data indicated by the quasi-WQE for inclusion in the packets. Note that TCU 52 inherently obeys the IB convention that channel adapters may allow write and send operations on a given QP to bypass pending read requests, because the TCU passes write and send requests to write engine 104 for immediate execution, while read requests are placed in schedule queues 102 to await execution.

According to IB convention, atomic operations are also allowed to bypass outstanding RDMA read requests. Therefore, like write and send requests, atomic operations are also carried out by write engine 104 without queuing. The reply data for the atomic operations are then entered as quasi-WQEs in RDB 40, and the corresponding QPs are entered in schedule queues 102, so as to return the responses in appropriate response packets to the remote requester.

To access quasi-WQEs 110 in RDB 40, execution engines 92 refer to pointers and other information for each QP that are held in QP context 42. The information is maintained in such a way as to ensure that TCU 52 and execution unit 60 carry out requests in the proper order. The pointers indicate the base address and size of the allocated RDB section. They also include a read pointer 118, indicating the next RDB entry to be executed by the execution unit; a write pointer 120, indicating the last entry written to the RDB by the RDE; and a stop pointer 122, used to suspend execution by the execution unit. In addition, the QP context information includes the packet serial number (PSN) of the next packet expected to be received on this QP and the PSN of the last request completed for this QP. The next expected PSN is written to the QP context by TCU 52 for use in the transport check applied to incoming packets. The last completed PSN is updated by RDE 56 for write requests and by execution unit 60 for read requests that they have respectively handled.

As noted above, in order to service a given QP, execution engine 92 uses read pointer 118 to find the next quasi-WQE entry to be executed in the cyclic buffer in section 114 allocated to the QP in RDB 40. The execution engine executes the entries in sequence until it reaches stop pointer 122. If there are no entries to be executed for this QP in the RDB (as can occur if RDE 56 has rung the QP doorbell in order to respond to a write request), the execution engine sends an acknowledgment packet to the destination address indicated by the QP context. Read pointer 118 is incremented each time the execution engine reads an entry, while write pointer 120 is incremented by RDE 56 each time it writes a new entry to the buffer, overwriting the oldest entry in the cyclic buffer maintained for the QP in RDB 40. Preferably, the RDE does not advance the write pointer until it has received a commitment from controller 36 (FIG. 1) to carry out all previous write operations to memory 38, in order to ensure that no read operation can execute before all preceding write operations have been completed. Normally, in the absence of repeated requests, stop pointer 122 points to the same entry as write pointer 120.

TCU 52 refers to the PSN information in the RDB entries and in the QP context in order to identify and deal with repeated read requests that it receives. Repeated requests may be received, for example, when the original read response failed to reach the requesting host. Upon receiving a repeated read request to which the execution unit has already responded, TCU 52 checks RDB 40. If the corresponding quasi-WQE 110 is still present in the buffer, the TCU moves read pointer 118 so that the SDE will re-send the response. Preferably, stop pointer 122 is moved, too, so that execution engine 92 does not continue to execute subsequent read requests until they are repeated, as well. If TCU 52 does not find the quasi-WQE for a repeated request in RDB 40, the repeated request is dropped.

RDB 40 is also useful in dealing with repeated requests to carry out atomic operations. Since these operations modify the contents of an address in memory 38, they should not be repeated. On the other hand, it may occur that HCA 22 successfully carried out the atomic operation, but the remote requester did not receive the response. Therefore, when RDE 56 carries out an atomic request, it preferably writes the result as an quasi-WQE entry 110 in RDB 40. If TCU 52 detects a repeated atomic request (with the same PSN as the original one) on a given QP, it checks for the corresponding quasi-WQE in the RDB. If the TCU finds the PSN in the RDB with the correct operation code, it does not repeat the operation, but rather enters the QP in receive schedule queue 102 so that SDE 66 will return a response packet to the requester with the result taken from the RDB. The TCU also makes the necessary adjustments in the read pointer and stop pointer, as described above.

Figure 7:
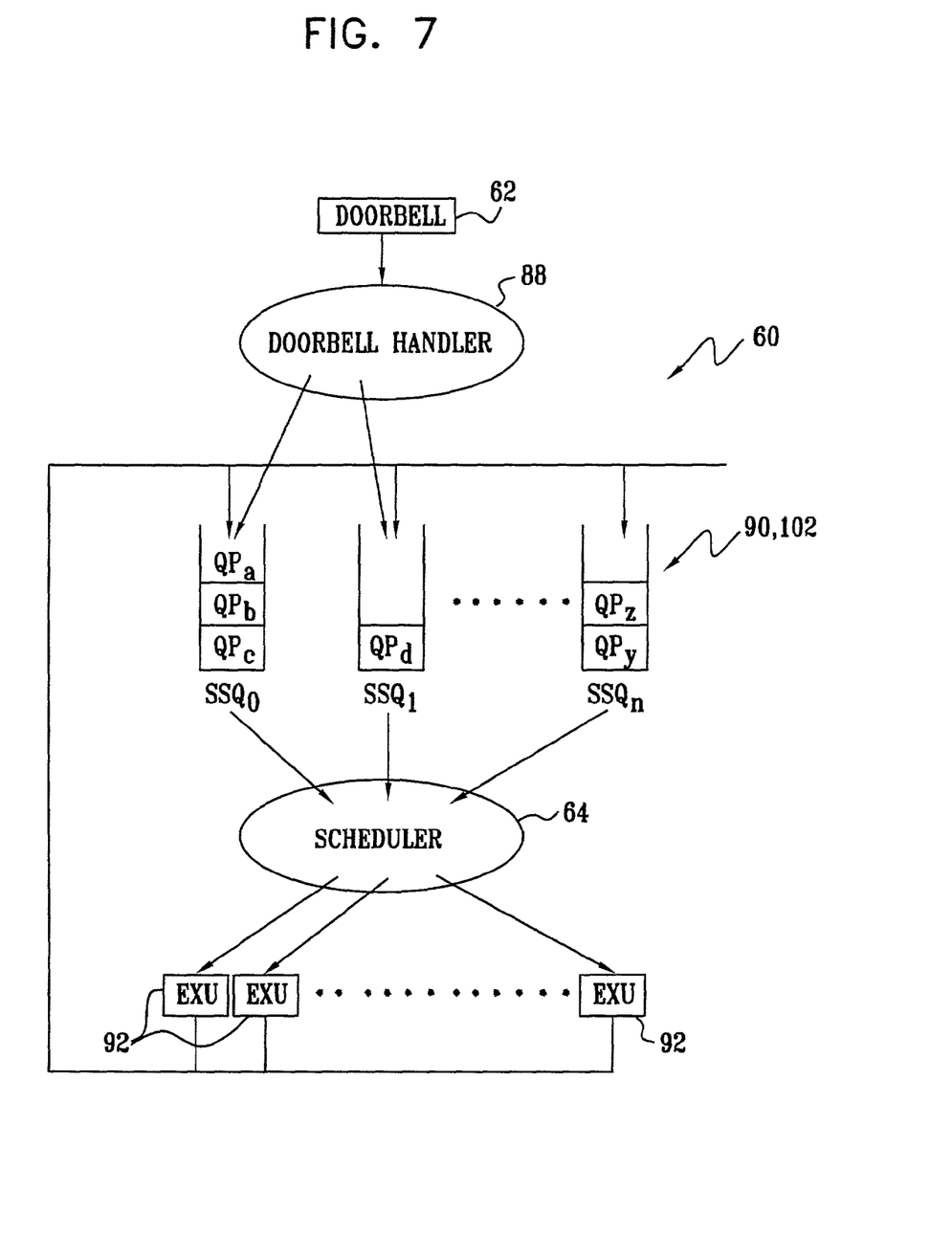
FIG. 7 is a block diagram that schematically illustrates operation of a scheduler in the HCA of FIG. 2, in accordance with a preferred embodiment of the present invention.

FIG. 7 is a block diagram that schematically shows details of execution unit 60, illustrating arbitration among schedule queues, in accordance with a preferred embodiment of the present invention. The arbitration process exemplified by this figure is typically applied to send (request) queues 90 and receive (response) queues 102 separately and independently. Thus, in the example shown in this figure, it is assumed that host 24 submits WRs on multiple queue pairs, labeled arbitrarily QPa, QPb, . . . , QPz, which are assigned to schedule queues 90. Alternatively, the same schedule queues may be used for both requests and responses on the respective QPs. In either case, depending on the respective QoS levels of these queue pairs, execution unit 60 distributes the corresponding QPs among schedule queues labeled SSQ0, SSQ1, . . . , SSQn.

Scheduler 64 assigns the schedule queues to execution engines 92 according to scheduling policies that are determined according to the QoS levels of the queues. When one of the execution engines is assigned to service a given schedule queue, it begins processing the outstanding WQEs of the QP that is at the head of the schedule queue (for example, QPc in SSQ0, or QPy in SSQn). The execution engine continues to process the WQEs of this QP until one of the following conditions occurs:

No more outstanding WQEs remaining to be executed in the QP send queue.
No HCA resources available to execute the next WQE.
Occurrence of a QP-specific condition or error that prevents execution.
Scheduler preemption by a higher-priority service.
A scheduler policy limit has been reached for this QP, such as the number of requests executed, packets or bytes sent, or time elapsed.

When the stop condition is reached, execution engine 92 records all changes in the corresponding QP data structures, waits for outstanding packets to be actually sent, and then reports to scheduler 64 that it is idle and ready to receive a new QP assignment. Any WQEs still outstanding for the QP last served (such as QPc or QPy in the example shown in the figure) are effectively placed at the end of the respective schedule queues.

Although preferred embodiments are described herein with reference to a particular network and hardware environment, including IB switch fabric 26 and bus 36, the principles of the present invention may similarly be applied to networks and data connections of other types. Moreover, although these preferred embodiments relate specifically to HCA 22, some of the features of the HCA may also be implemented, mutatis mutandis, in channel adapters of other types, such as target channel adapters (TCAs), as well as in network interface adapters used in other packet networks. Therefore, the use, in the present patent application and in the claims, of certain terms that are taken from the IB specification to describe network devices, and specifically to describe HCAs, should not be understood as implying any limitation of the claims to the context of InfiniBand. Rather, these terms should be understood in their broad meaning, to cover similar aspects of network interface adapters that are used in other types of networks and systems.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A network interface adapter, implemented on at least one integrated circuit chip and comprising:

a host interface, for coupling to a host processor;
an outgoing packet generator, operative to generate an outgoing request packet for delivery to a remote responder responsive to a request submitted by the host processor via the host interface;
a network output port, coupled to the outgoing packet generator to receive the outgoing request packet from the outgoing packet generator and to transmit the outgoing request packet over a network to the remote responder;
a network input port, for coupling to the network to receive an incoming response packet from the remote responder, in response to the outgoing request packet sent thereto, and further to receive an incoming request packet sent by a remote requester; and
an incoming packet processor, coupled to the network input port to receive and process both the incoming response packet and the incoming request packet, and further coupled to cause the outgoing packet generator, responsive to the incoming request packet, to generate, in addition to the outgoing request packet, an outgoing response packet for transmission via the network output port to the remote requester;
wherein the outgoing request packet comprises an outgoing write request packet containing write data taken from a system memory accessible via the host interface;
wherein the outgoing response packet comprises an outgoing read response packet containing read data taken from the system memory in response to the incoming request packet;
wherein the incoming request packet comprises an incoming RDMA read request packet specifying data to be read from a system memory that is external to the network interface adapter and that is accessible via the host interface;

wherein the incoming packet processor is operative to write a quasi-WQE to a first memory location, in the system memory, indicating the data to be read from the system memory responsive to the incoming RDMA read request packet;

wherein the outgoing packet generator is operative to read the quasi-WQE from the first memory location and, responsive thereto, to read the indicated data and to generate the outgoing response packet containing the indicated data;

wherein the outgoing packet generator comprises a hardware gather engine, which is coupled to gather both the write data and the read data from the system memory for inclusion in the respective outgoing request and response packets via a commonly shared data flow path from the system memory to the network output port; and wherein to submit the request, the host processor writes a request descriptor indicative of the write data to a second memory location, and wherein the hardware gather engine is operative to read information from the quasi-WQE and from the request descriptor and to gather the read data and the write data responsive thereto.

2. An adapter according to claim 1, wherein the outgoing packet generator comprises a plurality of schedule queues, and is operative to generate the outgoing request packet and the outgoing response packet responsive to respective entries placed in the schedule queues of the plurality of schedule queues.

3. An adapter according to claim 2, wherein the network input and output ports are operative to receive and send the incoming and outgoing packets, respectively, over a plurality of transport service instances, and wherein the outgoing request packet and the outgoing response packet are associated with respective transport service instances among the plurality of transport service instances, and wherein the outgoing packet generator is operative to assign the transport service instances of the plurality of transport service instances to the schedule queues of the plurality of schedule queues based on service parameters of the transport service instances of the plurality of transport service instances, and to place the entries in the schedule queues of the plurality of schedule queues corresponding to the transport service instances, of the plurality of transport service instances, with which the incoming and outgoing packets are associated.

4. An adapter according to claim 3, wherein the outgoing packet generator comprises:

one or more execution engines, which are operative to generate the outgoing request packet and the outgoing response packet responsive to a list of work items respectively associated with each of the transport service instances of the plurality of transport service instances; and a scheduler, which is coupled to select the entries from the plurality of schedule queues and to assign the transport service instances of the plurality of transport service instances to the one or more execution engines for execution of the work items responsive to the service parameters.

5. An adapter according to claim 3, wherein the transport service instances of the plurality of transport service instances comprise queue pairs.

6. An adapter according to claim 2, wherein the outgoing packet generator comprises one or more doorbell registers, to which the host processor and the incoming packet processor write in order to place the entries in the schedule queues of the plurality of schedule queues.

7. An adapter according to claim 2, wherein the incoming request packet comprises an incoming write request packet carried over the network on a reliable transport service, and wherein responsive to the incoming write request packet, the incoming packet processor is operative to add an entry to the entries placed in the schedule queues of the plurality of schedule queues, such that responsive to the entry, the outgoing packet generator generates an acknowledgment packet.

8. An adapter according to claim 1, wherein the incoming packet processor is configured so that when it receives an incoming write request packet containing write data to be written to a system memory accessible via the host interface after receiving the incoming RDMA read request packet, it conveys the write data to the host interface without waiting for execution of the quasi-WQE.

9. An adapter according to claim 1, wherein the incoming packet processor is configured so that when it receives an incoming write request packet containing write data to be written to a system memory accessible via the host interface before receiving the incoming RDMA read request packet, it prevents execution of the quasi-WQE until the write data have been written to the system memory.

10. An adapter according to claim 1, wherein the outgoing packet generator is operative, upon generating the outgoing request packet, to notify the incoming packet processor to await the incoming response packet and to write a completion message to the host interface when the awaited incoming response packet is received.

11. An adapter according to claim 1, wherein the incoming RDMA read request packet is one of a plurality of incoming RDMA read request packets, and wherein the incoming packet processor is operative to write a list of corresponding quasi-WQEs to the first memory location, each said quasi-WQE indicating the data to be read from the system memory responsive to the corresponding incoming RDMA read request packet, responsive to which the outgoing packet generator is operative to generate a sequence of corresponding outgoing response packets.

12. An adapter according to claim 11, wherein the network input and output ports are operative to receive and send the incoming and outgoing packets, respectively, over a plurality of transport service instances, and wherein the incoming packet processor is operative to prepare the list of the quasi-WQEs for each of the transport service instances of the plurality of transport service instances as a part of a response database held for the plurality of the transport service instances in common.

13. An adapter according to claim 12, wherein the transport service instances of the plurality of transport service instances comprise queue pairs.

14. An adapter according to claim 1, wherein the request comprises a write request, which is submitted by the host processor by generating a request descriptor indicating further data to be read from the system memory for inclusion in the outgoing request packet, and wherein the output packet generator is operative to read the request descriptor and, responsive thereto, to generate the outgoing request packet as a write request packet containing the indicated further data.

15. A method for coupling a host processor to a network, comprising:

generating an outgoing request packet for delivery to a remote responder using an outgoing packet generator of a network interface adapter that is implemented on at least one integrated circuit chip, responsive to a request submitted by the host processor;

transmitting the outgoing request packet from the outgoing packet generator over the network to the remote responder;

receiving an incoming response packet from the remote responder, in response to the outgoing request packet sent thereto, using an incoming packet processor of the network interface adapter;

receiving an incoming request packet sent by a remote requester using the incoming packet processor; and coupling the incoming packet processor to the outgoing packet generator to cause the outgoing packet generator to generate, responsive to the incoming request packet, in addition to the outgoing request packet, an outgoing response packet for transmission via the network to the remote requester;

wherein generating the outgoing request packet comprises generating an outgoing write request packet containing write data taken from a system memory that is external to the network interface adapter and that is associated with the host processor;

wherein coupling the incoming packet processor to the outgoing packet generator comprises generating, using the outgoing packet generator, an outgoing read response packet containing read data taken from the system memory in response to the incoming request packet;

wherein receiving the incoming request packet comprises receiving an incoming RDMA read request packet specifying data to be read from a system memory associated with the host processor, wherein coupling the incoming packet processor comprises writing, in response to the incoming RDMA read request packet, a quasi-WQE to a first memory location of the system memory indicating the data to be read therefrom, and causing the outgoing packet generator to read the quasi-WQE from the first memory location and, responsive thereto, to read the indicated data from the system memory and to generate the outgoing response packet containing the indicated data;

wherein generating the outgoing write request packet and generating the outgoing read response packet comprise generating the packets using a hardware gather engine in the outgoing packet generator, which is coupled to gather both the write data and the read data from the system memory for inclusion in the respective outgoing request and response packets via a commonly shared data flow path from the system memory to the network; and wherein generating the outgoing write request packet comprises generating a request descriptor indicative of the write data to a second memory location, and wherein generating the packets using the hardware gather engine comprises reading information from the quasi-WQE and from the request descriptor using the hardware gather engine and gathering the read data and the write data responsive thereto.

16. A method according to claim 15, wherein the outgoing packet generator comprises a plurality of schedule queues, and wherein generating the packets comprises generating the outgoing request packet and the outgoing response packet responsive to respective entries placed in the schedule queues of the plurality of schedule queues.

17. A method according to claim 16, wherein the outgoing request packet and the outgoing response packet are associated with respective transport service instances among a plurality of transport service instances in use on the network, and wherein generating the outgoing request packet and the outgoing response packet comprises assigning the transport service instances of the plurality of transport service instances to the schedule queues of the plurality of schedule queues based on respective service parameters of the transport service instances of the plurality of transport service instances, and placing the entries in the schedule queues, of the plurality of schedule queues, corresponding to the transport service instances, of the plurality of transport service instances, with which the packets are associated.

18. A method according to claim 17, wherein generating the outgoing request packet and the outgoing response packet comprises allocating resources to process the schedule queues, of the plurality of schedule queues, responsive to the respective service parameters.

19. A method according to claim 17, wherein the transport service instances of the plurality of transport service instances comprise queue pairs.

20. A method according to claim 16, wherein receiving the incoming request packet further comprises receiving an incoming write request packet on a reliable transport service, and wherein generating the outgoing response packet comprises adding an entry to the entries in the schedule queues of the plurality of schedule queues, causing the outgoing packet generator, responsive to the entry, to generate an acknowledgment packet.

21. A method according to claim 16, wherein generating the outgoing write request packet and generating the outgoing read response packet both comprise writing to doorbell registers of the outgoing packet generator in order to place the entries in the schedule queues of the plurality of schedule queues.

22. A method according to claim 15, wherein receiving the incoming request packet further comprises receiving an incoming write request packet containing write data to be written to a system memory associated with the host processor after receiving the incoming RDMA read request packet, and comprising conveying the write data to the system memory using the incoming packet processor without waiting for execution of the quasi-WQE associated with the outgoing read response packet.

23. A method according to claim 15, wherein receiving the incoming request packet further comprises receiving an incoming write request packet containing write data to be written to a system memory associated with the host processor before receiving the incoming RDMA read request packet, and comprising conveying the write data to the system memory using the incoming packet processor while preventing execution of the quasi-WQE associated with the outgoing read response packet until the write data have been written to the system memory.

24. A method according to claim 15, wherein transmitting the outgoing request packet comprises passing a notification from the output packet generator to the incoming packet processor to await the incoming response packet to be received in response to the outgoing request packet, and comprising writing a completion message to the host processor when the incoming packet processor receives the awaited packet.

25. A method according to claim 15, wherein receiving the incoming RDMA read request packet comprises receiving a plurality of incoming RDMA read request packets, and wherein writing the quasi-WQE comprises writing a list of said quasi-WQEs to the first memory location, causing the outgoing packet generator to generate a sequence of corresponding outgoing response packets containing respective indicated data.

26. A method according to claim 25, wherein receiving the plurality of incoming RDMA read request packets comprises receiving the plurality of incoming RDMA read request packets over a plurality of transport service instances on the network, and wherein writing the list of the descriptors comprises writing a respective list for each transport service instance of the plurality of the transport service instances to a response database held for the plurality of the transport service instances in common, causing the outgoing packet generator to generate the packets for transmission over the plurality of the transport service instances.

27. A method according to claim 26, wherein the transport service instances of the plurality of transport service instances comprise queue pairs.

28. A method according to claim 15, wherein the request comprises a write request, which is submitted by the host processor by generating a request descriptor in a second memory location indicating further data to be read from the system memory for inclusion in the outgoing request packet, and wherein generating the outgoing request packet comprises reading the request descriptor from the second memory location and, responsive thereto, generating a write request packet containing the indicated further data.

* * * * *